United States Patent [19]
Lowery

[11] Patent Number: 5,853,215
[45] Date of Patent: Dec. 29, 1998

[54] MOBILE SPRAYBOOTH WORKSTATION

[76] Inventor: Robert S. Lowery, 8247 Forest Lake Dr., Conway, S.C. 29526

[21] Appl. No.: 903,859

[22] Filed: Jul. 31, 1997

Related U.S. Application Data

[63] Continuation-in-part of Ser. No. 714,503, Sep. 16, 1996, which is a continuation of Ser. No. 337,038, Mar. 22, 1995, abandoned.

[51] Int. Cl.$^6$ ...................................................... B60P 3/07
[52] U.S. Cl. ...................................... 296/24.1; 296/26.13
[58] Field of Search ................................. 296/24.1, 26.12, 296/26.13; 118/326, 309; 55/DIG. 46

[56] References Cited

U.S. PATENT DOCUMENTS

| | | |
|---|---|---|
| 4,091,876 | 5/1978 | Valdatta . |
| 4,532,886 | 8/1985 | Bouchard . |
| 4,556,247 | 12/1985 | Mahaffey . |
| 4,872,419 | 10/1989 | Blankmeyer et al. . |
| 4,879,152 | 11/1989 | Green . |
| 4,909,815 | 3/1990 | Meyer . |
| 4,915,435 | 4/1990 | Levine . |
| 4,926,746 | 5/1990 | Smith ......................................... 454/51 |
| 4,981,318 | 1/1991 | Doane et al. . |
| 5,059,446 | 10/1991 | Winkle, Sr. et al. . |
| 5,090,623 | 2/1992 | Burns et al. . |
| 5,113,600 | 5/1992 | Telchuk . |
| 5,119,992 | 6/1992 | Grime . |
| 5,154,469 | 10/1992 | Morrow . |
| 5,174,628 | 12/1992 | Hayatsugu et al. . |
| 5,176,755 | 1/1993 | Winkle, Sr. et al. . |
| 5,224,974 | 7/1993 | Johnson .................................... 118/698 |
| 5,282,145 | 1/1994 | Lipson et al. . |
| 5,397,606 | 3/1995 | Jeffs . |
| 5,487,766 | 1/1996 | Vannier ...................................... 55/356 |
| 5,560,444 | 10/1996 | Tiedge ...................................... 296/26.13 |
| 5,570,924 | 11/1996 | Few et al. .............................. 296/26.13 |
| 5,584,759 | 12/1996 | Fabrizi ...................................... 118/326 |
| 5,620,224 | 4/1997 | DiBiagio et al. ..................... 296/26.13 |

FOREIGN PATENT DOCUMENTS

| | | |
|---|---|---|
| 1330812 | 7/1989 | Canada . |
| 2130153 | 6/1983 | United Kingdom . |

Primary Examiner—Joseph D. Pape
Assistant Examiner—Clovia Hamilton
Attorney, Agent, or Firm—Michael F. Labbee; Kilpatrick Stockton LLP

[57] ABSTRACT

A trailer that is towed behind a utility vehicle which serves as a "bodyshop on wheels". Extendible rooms on either side of the trailer provide the necessary workspace. A car may be driven into the mobile spraybooth workstation. A fresh air mask and ventilation systems are provided for safety. Infrared curing lights are also provided for rapid drying of the painted vehicle. Once the item is dry, it can be taken out of the mobile spraybooth workstation and another item can then be painted.

13 Claims, 7 Drawing Sheets

MOBILE SPRAYBOOTH WORKSTATION

CROSS REFERENCE TO RELATED APPLICATIONS

This application is a continuation-in-part of U.S. Ser. No. 08/714,503, filed Sep. 16, 1996 by Robert S. Lowery, entitled "Mobile Spraybooth Workstation" which is a continuation of U.S. Ser. No. 08/337,038, filed on Mar. 22, 1995, now abandoned, by Robert S. Lowery entitled "Mobile Spraybooth Workstation."

FIELD OF INVENTION

This invention relates to paint spray booths, specifically a spray booth that can be moved easily from one location to another.

BACKGROUND OF THE INVENTION

There are many companies that offer mobile paint repair services. These paint repair services can be performed on cars, furniture, appliances, and other small parts or items. Currently, mobile paint repair applications spray either inside or outside, depending on the size of the item being sprayed. Outdoor spraying is often impractical due to concerns for the environment and regulations governing the release of hazardous chemicals into the air. Quality control can also be a problem as dust, insects and other debris may become embedded in the paint. Also, it may be impossible to spray outside when the temperature is below a certain level.

Indoor spraying, such as in a spraybooth, eliminates many of these problems, but is subject to many regulations, such as fire hazard, air quality and hazardous materials handling regulations. These regulations require that a variety of systems be installed in the spraybooth such as fire suppression systems; air exchangers, ventilators and fresh air masks; and particulate filtration systems.

One approach to indoor spraying is a stationary paint spraybooth. Because these spraybooths are fixed and typically housed within a larger building, it is relatively easy to provide the required safety systems. Obviously, however, such a spraybooth cannot be moved from customer to customer. Thus, customers must go to the spraybooth for service. This may be impractical or inconvenient for the customer and may limit the operator's market. Moreover, stationary spraybooths are costly as they must be housed in a building, imposing leasing or other property costs on the operator.

Portability may be achieved through the use of tents or other temporary structures; however, currently regulatory regimes define any enclosed structure in which spray painting takes place as a spraybooth. Thus, a portable spraybooth must satisfy the same regulatory constraints as a fixed spraybooth. Thus, any temporary structure, such as a tent, will require all of the same features now required in a fixed spraybooth, such as fire suppression equipment, air exchangers and air filtration systems. Moreover, a spraybooth has other practical requirements, such as daylight correct lighting to ensure proper color matching and paint delivery systems. All of these systems would make a temporary structure very complex and, thus, difficult to move around and deploy for use.

For instance, a fabric structure may be impractical unless it is completely opaque, as light filtered through the fabric may be colored, making it impossible to achieve a proper color match. Furthermore, the presence of paint fumes and other volatile and flammable vapors in a spraybooth creates a significant fire hazard. Thus, all ignition sources, such as electrical switches and outlets must be positioned outside of the spray area. In a stationary booth the ignition sources may simply be placed outside of the booth and the operator may step out of the booth to manipulate the controls. Entry and exit from the spraybooth is not a problem, because the spraybooth is usually housed in a larger building, thus protecting the entrance of the spraybooth from wind and debris. A temporary booth, however, would not be housed within a structure. Consequently, if the operator were to step outside to manipulate the controls wind and debris may enter the painting area. Alternatively, an airlock may be used, but this would further increase the complexity of the structure.

Additionally, most spraybooths require a curing station in order to dry the paint thoroughly. The curing lamps generate substantial heat which may ignite the fumes released by the painting process; thus, curing rooms are typically separated from the spraybooth to avoid safety hazards. A separate curing room would further complicate the deployment of a temporary structure.

SUMMARY OF THE INVENTION

The mobile spraybooth workstation of the present invention comprises a trailer with expandable sides. The expandable sides allow a object as large as an automobile to be driven into the compartment for spray painting, while allowing the workstation to be moved about on public roads without violating vehicle width requirements. The interior compartment has all of the equipment necessary to perform high quality paint repair and meet all relevant regulations, including a cross-draft ventilation system, daylight correct fluorescent lights, infra-red curing lights, fire suppression system, high volume/low pressure turbine, fresh air system and filters. The workstation is housed on a triple axle trailer and, thus, has the advantage of being mobile.

All ignition sources, such as switches, motors, pumps, fans, power supplies, etc. are housed outside of the compartment to reduce fire hazard. A radio-frequency remote control system is provided to allow the operator to control all of the systems without having to step out of the compartment. Safety lockouts are provided to prevent any functionality conflicts. For instance, the curing lamps cannot be operated when the paint delivery system is operating, thus reducing the risk of fire. This allows both painting and curing operations to be performed in the same room, thereby reducing the overall space required for the workstation.

The high-volume cross-ventilation system provides rapid purging of the spray area. Intake and exhaust filters are provided to prevent debris from entering the spray area and prevent particulates and volatile organic compounds (VOCs) from being vented into the environment.

Accordingly, an objects of the invention is to provide a mobile paint spraybooth.

Another object of the invention is to provide a mobile spraybooth that allows the painter to have greater control over the quality of his work.

A further object of the invention is to provide a mobile spraybooth that enables the painter to work during unfavorable weather conditions such as rain or cold temperatures.

Yet another object is to provide a unitary spraybooth and curing station, thereby decreasing the cost of additional equipment as well as the room required to house a separate curing system.

An additional object is to provide an environmentally safe alternative to spraying hazardous chemicals directly into the atmosphere.

Another object of the invention provide a spraybooth which may be moved from location to another.

An additional object is to provide a workstation that can be towed on public roads.

Still further objects and advantages will become apparent from a consideration of the ensuing description and accompanying drawings, which are not intended to limit the scope of the invention, but are exemplary embodiments thereof.

DETAILED DESCRIPTION

Figure 1:
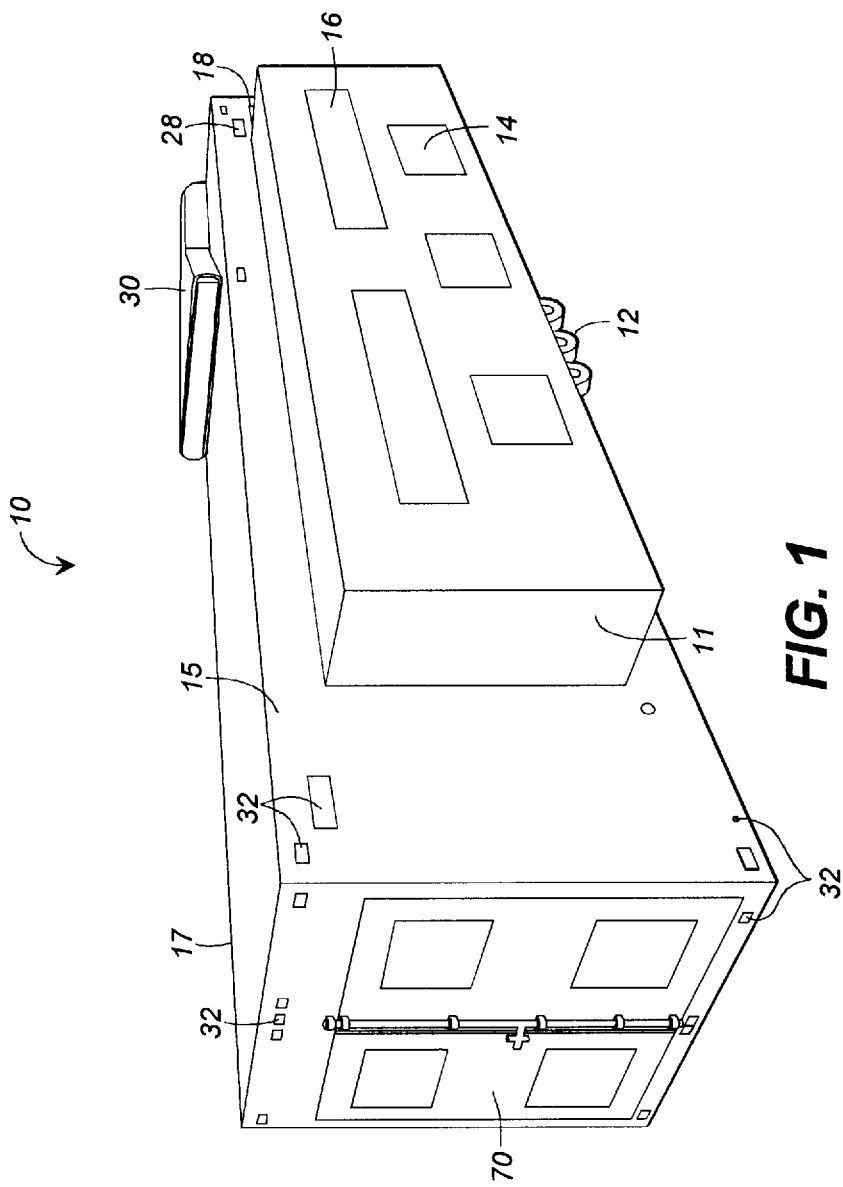
FIG. 1 is a perspective view of a mobile spraybooth workstation of the invention with the side rooms extended.

FIGS. 1–7 show a mobile spraybooth workstation 10 in accordance with the present invention. Workstation 10 is a trailer-like structure approximately twenty-eight feet in length, twelve feet in height and eight feet wide. These dimensions will allow workstation 10 to be transported on public roads without the need for permits for oversized vehicles. Side room 11 extends from the side of workstation 10 to provide additional interior room for performing painting operations. Another side room 13 (see FIG. 5) may be provided on the other side of workstation 10. When side rooms 11 and 13 are expanded, the overall width of workstation 10 increases to about fourteen feet. Other dimensions may be selected to accommodate larger or smaller objects as desired or comply with differing vehicle size regulations.

The foundation of the unit is a trailer base 12. As shown in FIG. 2, frame 12 is a conventional truss chassis which may be made of steel, aluminum or any other suitable material. Workstation 10 is affixed to base 12 by conventional means, such as welding, fasteners or other affixing means. In the illustrative embodiment shown in FIG. 1, a triple axle wheel unit is be affixed to the bottom of base 12. Other numbers and combinations of wheels and axles may be used as appropriate for the weight and size of workstation 12.

Figure 3:
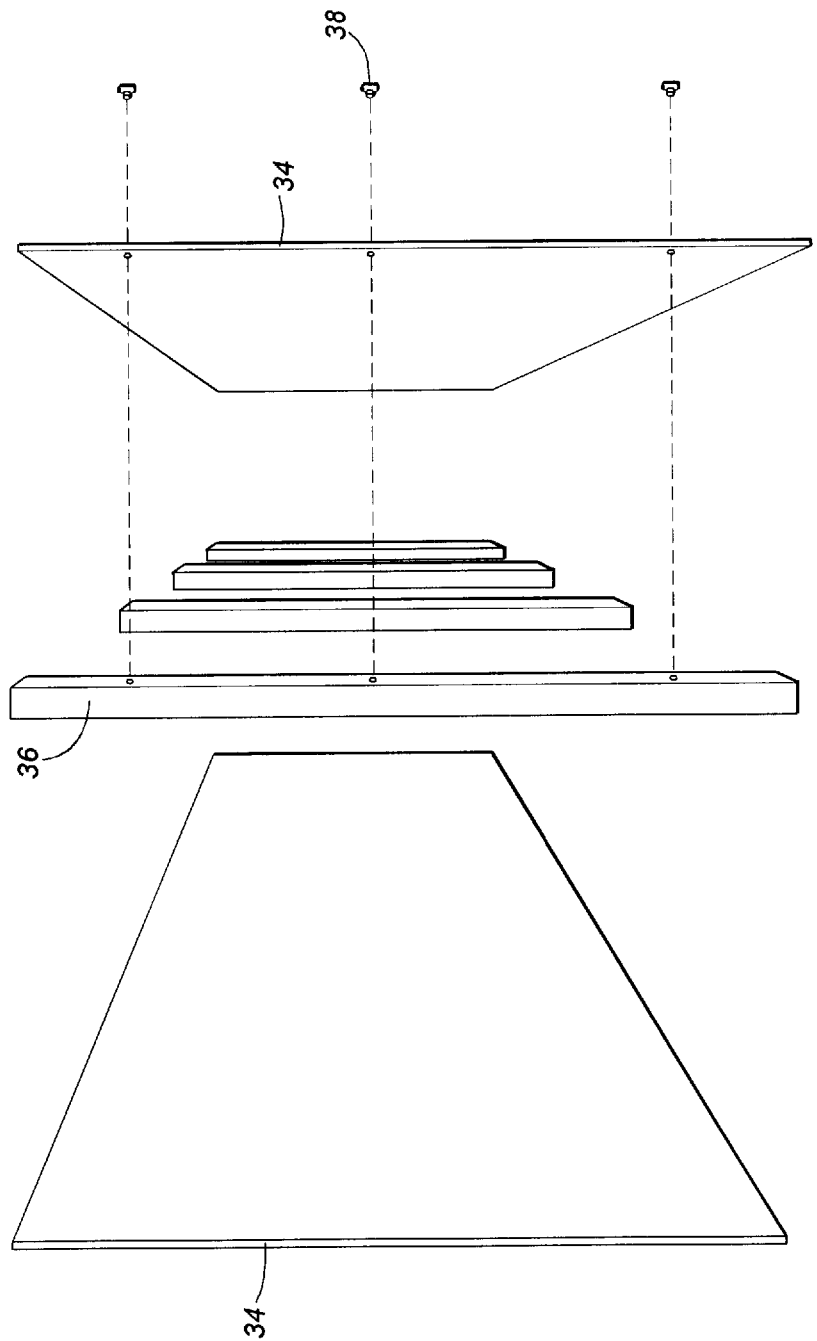
FIG. 3 is an exploded view of the wall section of workstation of FIG. 1.

FIG. 3 shows a typical representation of the superstructure, the walls and roof, of workstation 10. Aluminum sheeting 34 is placed on both sides of aluminum studs 36. The aluminum sheeting 34 is held in place by rivets 38 or other fasteners. In the illustrative embodiment, workstation 10 is constructed primarily of aluminum in order to reduce overall weight. The reduced weight allows workstation 10 to be towed by a relatively small or light vehicle. Other materials may be used as appropriate or desirable.

Figure 2:
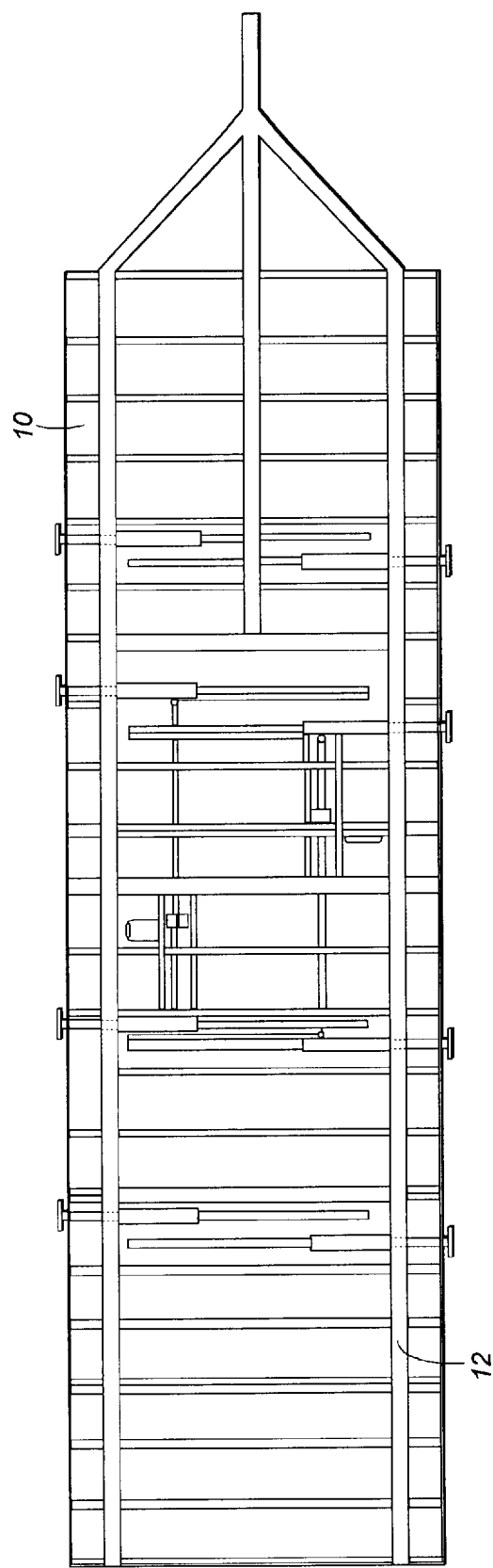
FIG. 2 is a bottom view of the workstation of FIG. 1.
Figure 4:
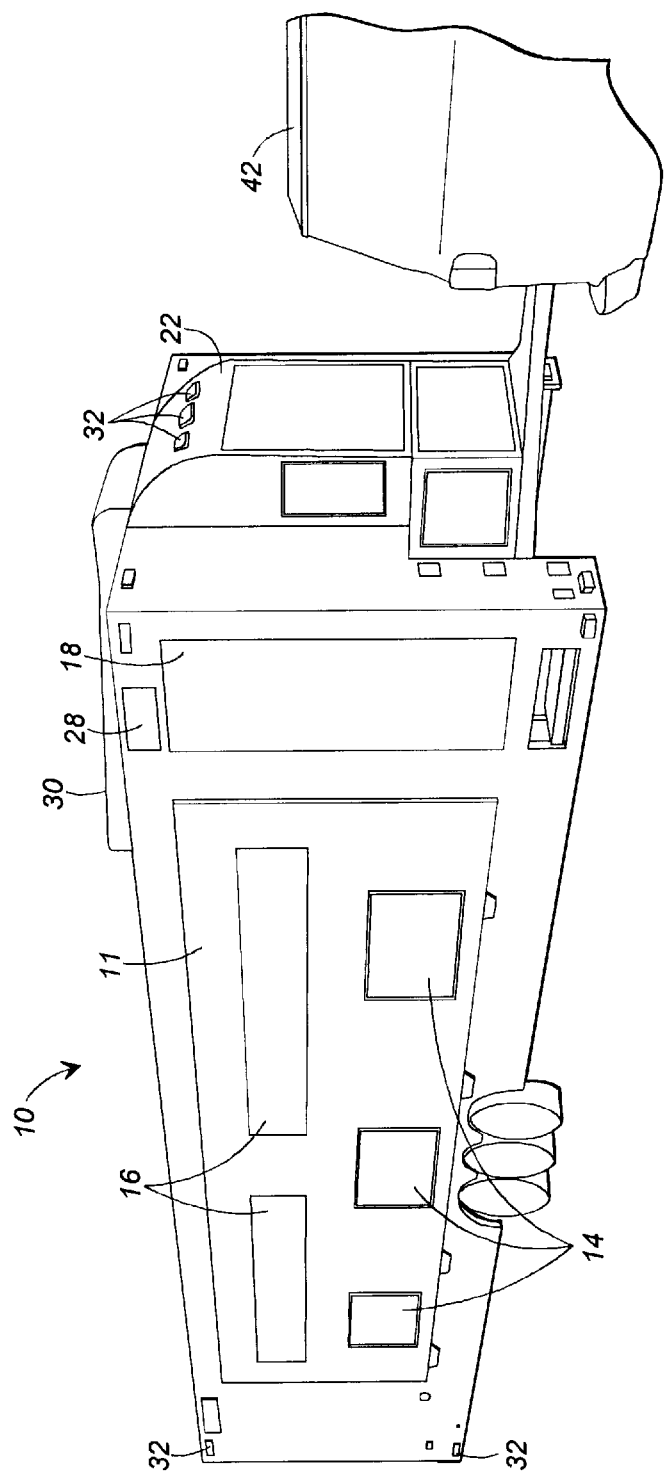
FIG. 4 is a perspective view of the workstation of FIG. 1 being towed behind a utility vehicle.

As shown in FIGS. 1 and 4, paint booth pre-filters 14 and glass windows 16 are built directly into the trailer 10, directly into trailer walls 15 and 17 or into the walls of side rooms 11 and 13, as desired. An additional air vent 28 may be provided as necessary or desired. For example, an air vent 28 may be provided above door 18. Air vent 28 will also include an air filter.

Figure 5:
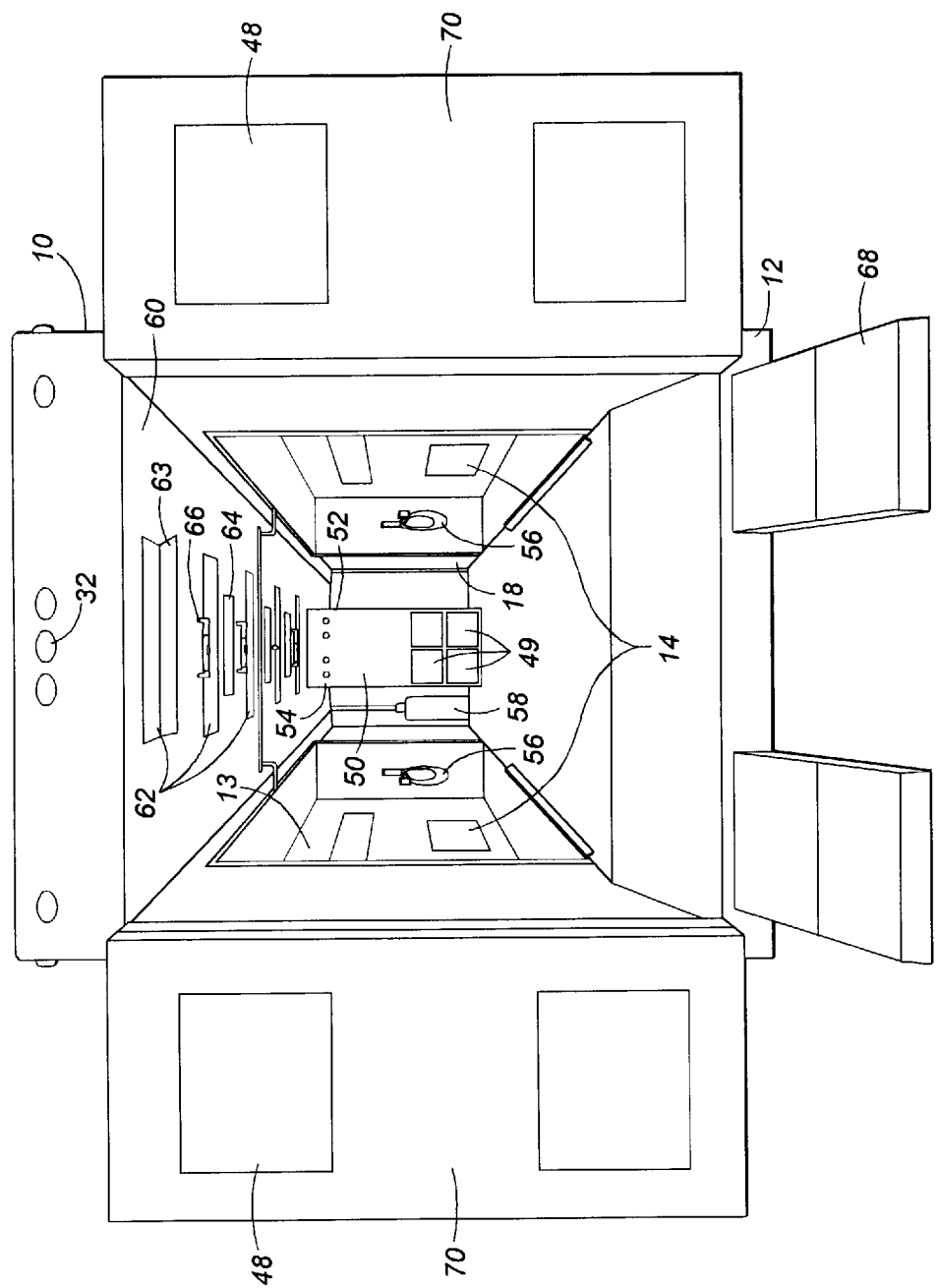
FIG. 5 is a rear view of the workstation of FIG. 1 with it sides extended and the rear doors open.

Door 18 provides personnel access to the interior of workstation 10. Door 18 is positioned near the front of workstation 10 in such a manner so that even if someone must enter or exit workstation 10 during spraying procedures, the danger of debris entering the compartment and impinging on the object being painted is minimized. Because, as shown in FIG. 5, door 18 is positioned away from and perpendicular to the painting area, any wind or debris entering door 18 will blow against fan housing compartment 50. Any debris which might scatter towards the object being painted is instead drawn into air filters 49 and is thereby kept away from the object.

FIG. 5 shows a rear view of workstation 10 with its rooms extended. Extendible rooms 11 and 13 are shown in their extended position. Hose hangers 56 are bolted into the extendible rooms 46. Rear doors 70 also provide access to the interior and are large enough to permit a car to be driven into workstation 10. Ramps 68 are provided to allow a vehicle to be driven into workstation 10. Doors 70 can be opened and closed with ramps 68 in either the extended or stowed positions.

Referring again to FIG. 1, exhaust ductwork 30 is installed on the top of the trailer 12. Various parking lights 32 and electrical outlets also may be provided on the exterior of workstation 10 in order to meet regulatory requirements or for the convenience of the operator.

FIG. 4 shows workstation 10 being towed behind a utility vehicle 42 such as a van. The control box 22 is mounted on the front of the trailer 12. Door panels 26 allow access to the control box 22.

Figure 6:
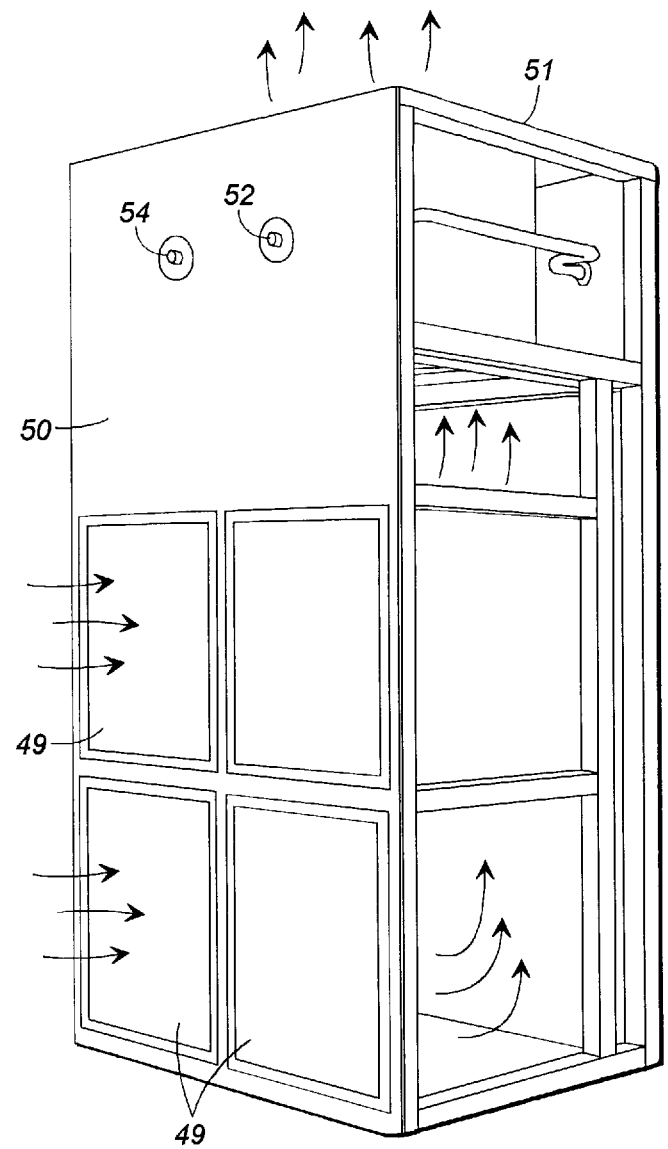
FIG. 6 is a perspective view of the fan compartment of the workstation of FIG. 1.

Referring to FIGS. 5 and 6, fan housing compartment 50 is provided at the front of workstation 10. High volume fans (not shown) are housed in compartment 50 which may provide four-hundred cubic feet per minute (CFM) or more of airflow. The high volume of flow allows workstation 10 to be purged in a short period of time. As shown in FIG. 6, air is drawn in through filters 49 through compartment 50 and out of the top 51 of compartment 50. Compartment 50 communicates with exhaust ductwork 30, so that air drawn through compartment 50 may be exhausted from workstation 10. Filters 49 are conventional filters which are capable of removing particulates and VOCs from the air to at least the degree required by law. A static pressure meter (not shown) may be provided within workstation 10 to indicate when filters 49 require replacement.

Fresh air hose outlet 52 and a turbine hose outlet 54 are mounted on the fan housing compartment 50. A fresh air mask (not shown) and High Volume/Low Pressure (HVLP) paint gun (not shown) will hang from hose hangers 56. The fresh air mask may be connected to outlet 52 to provide fresh air to the operator during painting operations. Likewise, the HVLP paint gun may be connected to outlet 54, which is itself connected to a HVLP turbine, for painting operations.

A fire suppression system canister 58 is mounted on the left side of the unit. The fire suppression sprinkler heads 66 are also mounted on the ceiling 60 or workstation 10. Any conventional fire suppression system may be used, provided it is capable of extinguishing or suppressing the types of fire anticipated in the painting environment to the extent required under applicable regulations.

Across the ceiling 60 are daylight correct fluorescent lights 62 and infrared curing lights 64. Lights 64 are mounted to the ceiling, but also or alternatively may be mounted on the walls, floor or any other location as appropriate. Alternatively, or in addition, skylights may be provided in the roof of the workstation to allow natural light to be used to illuminate the interior of the workstation. Moreover, windows 16 may provide sufficient light by which to work. The daylight correct fluorescent lights 60 provide light having a wavelength that has about a ninety-seven percent match with that of normal daylight. This allows the operator to accurately match paint colors. Other daylight correct lighting systems may also be used.

In the illustrative embodiment, three 2000 watt infrared curing tubes are used. Curing lights 62 are mounted to the ceiling, but also or alternatively may be mounted on the walls, floor or any other location as appropriate. The number and power of curing lights 62 may be selected as appropriate for the size of workstation 10, the size of the objects to be painted and other factors well know to those of skill in the art. Likewise, other curing systems may be used as appropriate. Curing lights 62 are protected by removable covers 63. Covers 63 engage safety lockouts which prevent side rooms 11 and 13 from being retracted while curing lights 62 are exposed. Another set of lockouts prevent curing lights 62 from being operated during painting operations. The safety lockouts may be mechanical switches which are opened and closed by the opening and closing of covers 63. The switches are in communication with the turbine 78 (see FIG. 7), the motors (not shown) for expanding rooms 11 and 13 and the power supply for curing lights 62. The switches prevent the motors or turbine 78 from operating when the covers are open. The switches prevent curing lights 62 from operating when the covers are closed.

Alternatively, the switches may be in communication with a computer or other logic device which controls the operation of the curing lights 62, the turbine 78 and the motors in a similar fashion. Moreover, a visual display (not shown) may be provided which tells the operator which systems may be operated based on the condition of the switches. These safety lockouts prevent the use of curing lights 62 in situations that would create or increase the risk of fire.

A retractable ramp 68 leads up to the mobile spraybooth workstation 40. Filters 48 are installed on the back doors 70 of the unit. Parking lights 32 are installed on the rear of the mobile spraybooth workstation 10.

Figure 7:
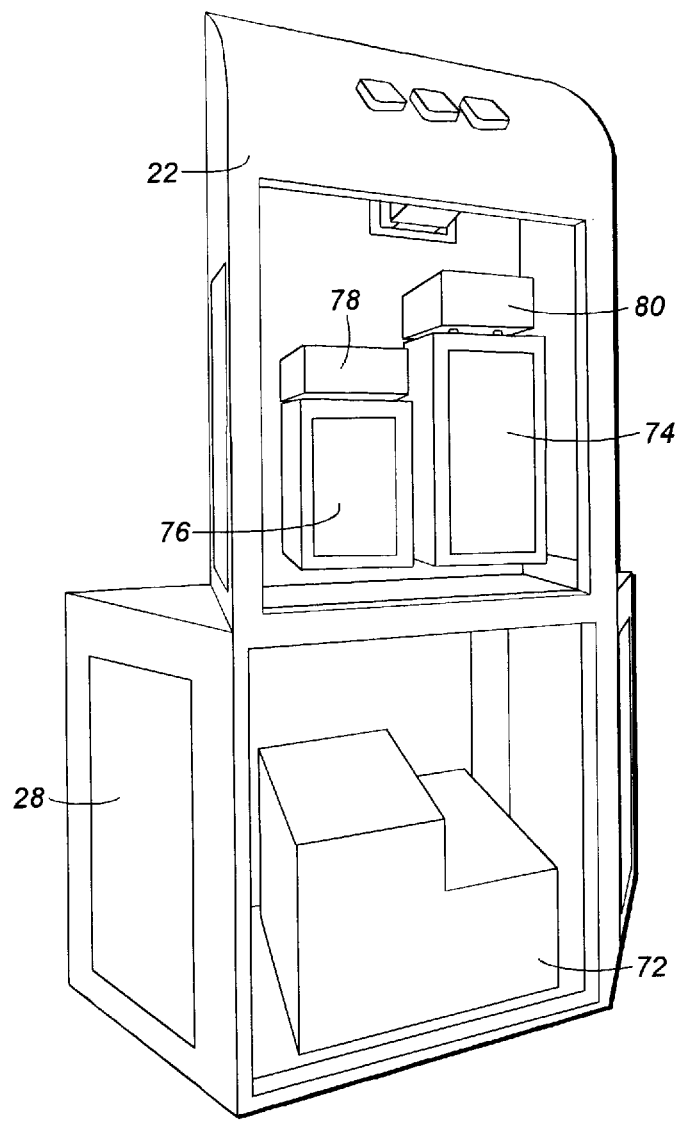
FIG. 7 is a perspective view of the control box of the workstation of FIG. 1 with the access panels removed.

FIG. 7 shows a close-up front view of the control box 22. A gasoline powered generator 72 is mounted on the bottom section of the control box 22. On the top section is mounted a breaker box 74 and control panel 76. Because all of the switches, motors and power outlets for each system elements are located in control box 22, all ignition sources are removed from the interior of workstation 10, thereby reducing fire hazard. A High Volume/Low Pressure (HVLP) turbine 78 is bolted into the control panel 76. A fresh air system pump 80 is placed on top of the breaker box 74. A fan motor (not shown) is installed on the top of the control box 22. Air vents 28 for the gasoline powered generator 72 are mounted in the control box 22. In the illustrative embodiment, generator 72 is a 10,000 watt, 57 amp gasoline powered generator. Other types of generators, such as diesel, may be used as desired and appropriate.

A radio frequency (RF) remote control system (not shown) controls all of the subsystems. A remote control, similar to a television remote, is provided which allows the operator to control all of the systems from within workstation 10. Thus, the operator may carry the remote about on his or her person, such as in a pocket, and may control the various systems of workstation 10 without the need to step out outside. Moreover, because no switches or other control devices carrying significant current or voltage are exposed to the interior of workstation 10, the number of potential ignition sources is reduced, thereby reducing fire hazard. Other types of remote control systems may be used, such as infrared, as appropriate.

To operate workstation 10, the operator typically will tow workstation 10, with its extendible rooms 11 and 13 retracted, behind a utility vehicle 42, such as a van, to the location of the object to be painted. Workstation 10 is parked and, if necessary, stabilized with leveling jacks (not shown). Extendible rooms 11 and 13 are extended using the remote control unit (not shown). The automobile or other object to be painted is prepared for painting using methods known to one of skill in the art. It may be desirable to perform such preparation outside of the workstation 10 to avoid contamination of the painting area with sanding particulates and other debris. Retractable ramp 68 is extended to allow the prepared, unpainted automobile or other object to be loaded into workstation 10. Once the car is inside, the back doors 70 of the unit are closed.

The operator enters workstation 10 through door 18. The operator then puts on the fresh air mask, connects the hose to fresh air outlet 52 and turns on the fresh air supply using the remote control unit. The operator turns on the fan with the remote control unit. The fan draws air into workstation 10 through filters 14 and 48. The fan continuously purges workstation 10 by carrying contaminated air through filters 49 and venting the now clean air through exhaust duct 30. The operator then turns on turbine 78 (using the remote control unit), connects the HVLP paint gun to the turbine house outlet 54 and paints the object using the HVLP paint gun. HVLP painting systems and their operation are known and understood to one of skill in the art.

When the painting is done, the painter will turn off the fan and turbine 78 using the remote control unit. A safety lockout keeps fan running for an additional three minutes in order to ensure workstation 10 is fully purged. The lockout time may be varied as appropriate to correspond to the size of the area to be purged and the CFM capacity of the fan. The operator may then turn on infrared curing lights 64 with the remote control switch to cure the paint on the automobile or other object. The safety lockouts prevent infrared curing lights 64 from operating when the fan and/or turbine is operating. This ensures that workstation 10 is completely purged of any hazardous and/or combustible materials before curing lamps 64 are turned on. Thus, simultaneous operation of the curing system and the painting system, as well as operation of the curing system while the atmosphere in workstation 10 has a high concentration of VOC's or flammable particles is prevented. This reduces or eliminates fire hazards.

After the paint is cured, the back doors 70 are opened, and the painted vehicle or object is backed down the ramp 68.

Accordingly, it can be seen that the mobile spraybooth workstation provides many benefits to the aftermarket painting industry. A painter will now be able to perform high quality, environmentally friendly work in many types of weather conditions. This is coupled with the fact that the spraybooth is mobile and can be towed anywhere the painter needs to have it.

Although the description above contains many specificities, these should not be construed as limiting the scope of the invention but as merely providing illustrations of some of the presently preferred embodiments of this invention. Various other embodiments and ramifications are possible within its scope. For example, furniture, car parts, appliances or anything else that needs painting can be done inside of the mobile spraybooth workstation. Thus, the scope of the invention should be determined by the appended claims and their legal equivalents, rather than the examples given.

What is claimed is:

1. A mobile paint spraybooth workstation for conducting automobile spray painting and curing operations, said workstation comprising:
   a. a trailer comprising a main body section comprising front and rear ends, a floor, ceiling, and first, second, third and fourth side walls, said main body section defining a single substantially enclosed room for performing both painting and curing operations in which the first and second side walls are extendible to increase the volume of the room while keeping the room substantially enclosed and the third side wall includes least one door;
   b. a control box mounted on the outside of the trailer;
   c. a high pressure, low volume turbine mounted in the control box and in communication with the inside of the room;
   d. a fresh air pump mounted in the control box and in communication with the inside of the room;
   e. a cross-draft ventilation system further comprising a filtering system;
   f. a plurality of infrared curing lights mounted inside the room; and
   g. a safety lockout system in communication with the turbine and the curing lights.

2. The workstation of claim 1 further comprising a remotely controlled electrical system mounted in the control box and in communication with, the turbine, the fresh air pump, the cross-draft ventilation system, the curing lights, and the lighting system.

3. The workstation of claim 1 further comprising an integrated fire suppression system mounted inside the room.

4. The workstation of claim 1 further comprising a generator mounted in the control box and connected to the turbine, the cross-draft ventilation system, the curing lights, the remote control system and the lighting system.

5. The workstation of claim 1 further comprising a daylight correct lighting system mounted inside the room.

6. A mobile paint spraybooth workstation for conducting automobile spraypaint operations, said workstation comprising:
   a. a trailer mounted on wheels and capable of being pulled on the road behind a vehicle comprising:
      i. a main body section comprising front and rear ends, a floor, ceiling, and two side walls, said main body section defining a single substantially enclosed room for performing both painting and curing operations;
      ii. two extendible side walls that increase the volume of the room while keeping the room substantially enclosed;
      iii. at least one door at the rear end of the trailer; and
      iv. a retractable ramp extendible from the rear end of the trailer to allow an automobile to enter the trailer;
   b. a spray painting system mounted inside the room for applying paint to the automobile once it has entered the room;
   c. a cross-draft ventilation system for ventilating the room;
   d. a filtering system for removing airborne paint particulates and other contaminants generated during spray painting or curing of the automobile inside the room;
   e. a paint curing system, comprising infrared curing lights mounted inside the room for curing the paint which has been applied to the automobile;
   f. a safety lockout system in communication with the spray painting system and the paint curing system for preventing simultaneous operation of the spray painting system and the paint curing system;
   g. a daylight correct lighting system mounted inside the room;
   h. an integrated fire suppression system mounted inside the room;
   i. a generator mounted on the trailer, wherein said generator powers the spray painting system, the cross-draft ventilation system, the paint curing system, and the lighting system; and
   j. a remote control system for remotely operating the spray painting system, the cross-draft ventilation system, the paint curing system, and the lighting system.

7. The mobile spraybooth workstation of claim 6 wherein the spray painting means is a high volume and low pressure turbine driven paint sprayer.

8. The mobile spraybooth of claim 6 further comprising a fresh air system.

9. A mobile paint spraybooth workstation for conducting automobile spray painting and curing operations, said workstation comprising:
   a. a trailer comprising a main body section comprising front and rear ends, a floor, ceiling, and first, second, third and fourth side walls, said main body section defining a single substantially enclosed room for performing both painting and curing operations in which the first and second side walls are extendible to increase the volume of the room while keeping the room substantially enclosed and the third side wall includes least one door;
   b. a control box mounted on the outside of the trailer;
   c. a high pressure, low volume turbine mounted in the control box and in communication with the inside of the room;
   d. a fresh air pump mounted in the control box and in communication with the inside of the room;
   e. a cross-draft ventilation system further comprising a filtering system;
   f. a plurality of infrared curing lights mounted inside the room; and
   g. a remotely controlled electrical system mounted in the control box and in communication with, the turbine, the fresh air pump, the cross-draft ventilation system, the curing lights, and the lighting system.

10. The workstation of claim 9 further comprising a safety lockout system in communication with the turbine and the curing lights.

11. The workstation of claim 9 further comprising an integrated fire suppression system mounted inside the room.

12. The workstation of claim 9 further comprising a generator mounted in the control box and connected to the turbine, the cross-draft ventilation system, the curing lights, the remote control system and the lighting system.

13. The workstation of claim 9 further comprising a daylight correct lighting system mounted inside the room.

* * * * *